United States Patent Office 2,944,922
Patented July 12, 1960

2,944,922

TREATMENT OF SPENT SULPHITE LIQUOR

Lawrence Allen Boggs and Averill J. Wiley, Appleton, Wis., assignors to Sulphite Products Corporation, Appleton, Wis., a corporation of Wisconsin No Drawing. Filed Apr. 23, 1956, Ser. No. 579,761

9 Claims. (Cl. 127—37)

The present invention relates generally to an improved method for recovering and preparing valuable products from wood hydrolysates and spent sulphite liquor. More particularly, the present invention provides methods for providing constituents of wood hydrolysates and spent sulphite liquor in substantially pure form.

Spent sulphite liquor is a by-product of the paper-making industry and results from the manufacture of wood pulp by the sulphite process. In the past, various uses for spent sulphite liquor have been found and, in this connection, the liquor may be used as a binder in the manufacture of briquettes. Concentrated spent sulphite liquor has been used successfully as a road binder because it penetrates deeply and sets quickly, thereby improving the wearing qualities of the road and presenting a dust free road surface.

In addition, processes have been developed which permit utilization of spent sulphite liquor as an adhesive, a tanning extract, and insulating materials. These and other processes have been proposed to utilize the spent sulphite liquor and many of them result in useful products of economic importance, but, in general, these known processes do not permit utilization or recovery of the constituent materials of the spent sulphite liquor.

As indicated, spent sulphite liquor is a solution of the soluble portion of wood resulting from the digestion of wood chips in the production of paper pulp by the sulphite process. In this process, the sulphite liquor used for digestion may be a calcium, magnesium, sodium, or ammonium base solution. On the other hand, the solution may be substantially neutral for use in the neutral sulphite process.

Generally speaking, the digestion of wood by the sulphite process removes about 30 to 50 percent, by weight, of the original wood chips, this removed material being in the spent sulphite liquor. As is well known, the principal constituents of the dissolved wood material are lignins and carbohydrates. The remaining constituents in the spent sulphite liquor include resins and some other materials. In general, each of these constituents would be commercially valuable if they could be economically recovered.

Various industrial processes have been developed for hydrolyzing wood, which in general involve acid treatment of wood at somewhat elevated temperatures. For example, in the kraft process for producing rayon grades of pulp, carbohydrates may be separated as pre-hydrolysis products by an acid pretreatment of the wood.

The carbohydrates present in spent sulphite liquors and wood hydrolysates are one of the more valuable by-products to be obtained from these materials. The carbohydrates primarily include free sugars and may include polymeric forms of the hexose sugars such as glucose, mannose and galactose; polymeric forms of the pentose sugars, as for example xylose and arabinose; derivatives of these sugars; and mixtures of the sugars. The lignins or lignin compounds present also appear to have valuable properties if they can be recovered without extensive conversion or polymerization.

Various methods have been proposed for the separation of carbohydrates from spent sulphite liquor and wood hydrolysates. These methods have involved the conversion of the carbohydrates to a more volatile substance, which is then removed by distillation. However, these methods of recovering sugar from the spent sulphite liquor generally require relatively large quantities of reagents so that a high cost operation results. In addition, such methods usually involve the use of high temperatures, appreciable reaction times and high acidities, which cause polymerization of the lignins present. Consequently, the lignins or lignin compounds remaining after separation of the carbohydrates are of little usefulness and are of little value.

Lignins and lignin compounds, the other principal constituents in wood hydrolysate and spent sulphite liquor, are polymers of various molecular weights. As indicated, lignins are present in combined and uncombined form. In the combined form, they are present as lignosulfonic acids and lignosulfonates. The lignins are easily modified but, in their unmodified form, are considered to have substantial value. Furthermore, various lignins are desirably separated and the recovery of various lignin fractions is desirable. As indicated, previously known processes for recovering carbohydrates have prevented recovery of lignins in an unmodified form and, particularly, have prevented recovery of various fractions from spent sulphite liquor and wood hydrolysates.

In view of the foregoing, the principal object of this invention is the provision of new processes for the treatment of wood hydrolysates and spent sulphite liquor.

Another object of the present invention is to provide a method for treating spent sulphite liquor and wood hydrolysates to effect separation of the carbohydrates from lignins without substantially modifying the lignins.

A still further object of this invention is to provide a method for recovering the various carbohydrates in wood hydrolysates and spent sulphite liquor, and making them more readily available for conversion to various industrial products.

Another object of the present invention is to provide a method for the recovery of the individual pentose sugars and hexose sugars particularly from spent sulphite liquor and wood hydrolysates in a relatively pure form.

An additional object of the invention is the provision of a method for recovering various lignin fractions from wood hydrolysates and spent sulphite liquor.

In the practice of the present invention, the spent sulphite liquor or wood hydrolysate is concentrated to substantial dryness, i.e. less than about 10 percent moisture, so as to permit separation of carbohydrates from lignins, and then these constituents are treated in such manner as to produce various carbohydrate materials and lignins of different molecular weights. The substantial drying of the spent sulphite or wood hydrolysate is an important and distinct feature of this invention.

More particularly, spent sulphite liquor is concentrated to substantial dryness by known procedures, as by concentrating in evaporators, and roll or spray drying. However, during the concentrating and drying operations, extended high temperature treatment is to be avoided so as to inhibit undesired polymerization or modification of the lignins or lignin compounds. The dried solids are normally a powder comprising about 95 percent solids. As previously indicated, this powder is a mixture of the soluble substances of wood. The amount of the constituents, and the components, in the solids vary according to the season of the year, the type of wood, and the wood treating conditions. By way of example, hard wood generally provides a higher amount of pentose sugar than soft wood and, in this connection, the carbohydrates in the spent liquor from the treatment of hard wood are predominantly pentoses. On the other hand, in the case of the treatment of soft wood, carbohydrates in the liquor are mainly hexoses.

In accordance with this invention, the dried spent liquor solids are treated to separate the carbohydrates from the lignins without modification of the lignins by mixing the solids with a solvent, under acid conditions which will readily solubilize the carbohydrates, but which do not dissolve the bulk of the lignins or lignin compounds. The acid condition is controlled so as to readily remove the carbohydrate without subjecting the lignin material to the polymerizing conditions which were included in previously known treatments of spent liquor.

As indicated, the solubilization of the spent liquor solids is carried out in the presence of some added acid preferably having an anion which forms a substantially insoluble salt with the cation of the lignin compound, such as sulfuric acid. The added acid is present in a stoichiometric amount substantially equivalent to about the amount of cation combined with the lignin compound, usually lignosulfonates, in the spent liquor solids. Since the added acid is not required for hydrolysis, but to combine with the cation to form a relatively insoluble salt, only a small amount is required as compared to many known processes. For example, with 100 grams of commercially available calcium base spent suplhite liquor solids only about fourteen grams of sulfuric acid were required to combine with the cation. This small amount of acid in the solvent does not effect any substantial change in the molecular structure of the lignins.

It is important that the acid not be added in excess, otherwise solubilization of the sugar may not be properly carried out and modification of the lignin compounds may result.

The solvent is preferably methyl alcohol or acetone, but other solvents having similar properties may be employed. In this connection, solvents may be chosen from the group comprising the lower alkyl alcohols, i.e., alcohols having alkyl groups with less than seven carbon atoms, or from the group of carbonyl compounds having less than eight carbon atoms, excepting cyclopentanone, which will not form a diylidene compound with sugars. In general, the boiling point of the solvent should be below about 290° F.

Solubilization should be carried out at relatively low temperatures, i.e. temperatures below about 55° C. In this connection, the initial products of the reaction of sugars with alcohols are furanosides, which, upon prolonged treatment at high temperature are converted to pyranosides. The furanosides are more readily hydrolyzed than are the pyranosides.

After mixing the solvent and acid, to form the insoluble salt, with the spent liquor solids, the supernatant liquor containing the carbohydrates is separated from the insoluble material containing lignins, as by filtration or centrifugation. The insoluble material may then be thoroughly washed with additional solvent to remove further carbohydrates. The separated supernatant liquid, containing the solubilized carbohydrates, is then subjected to treatment in a manner hereinafter to be described.

The insoluble portion which is recovered is primarily ligneous materials of varying molecular weight. These materials are separated by mixing them with solvent-water solutions so as to effect the solubilization of the lower molecular weight materials. The solvent is of the above described type, but, in addition, must be soluble to some degree in water. The ratio of solvent to water controls the degree of solubilization of lignin compounds, but this ratio may be limited by the solubility of the solvent in water. In practice, we have used a mixture of 80 percent, by volume, acetone and 20 percent, by volume, water. In general, with greater amounts of solvent, relative to the amount of water, lower molecular weight lignin compounds are solubilized.

After mixing of the ligneous materials with the solvent-water mixture, the insoluble materials are separated from the supernatant liquid and this liquid is neutralized. Neutralization may result in a precipitate which should be separated, if formed. The solvent is then removed from the neutralized liquid, as by distillation, to obtain lignosulfonates. If it is desired to obtain a lignosulfonic acid, the neutralization step may be omitted.

Recovery of purified higher molecular weight ligneous materials may be effected by mixing the residue from the first separation with the solvent-water mixture in different ratios or with water alone, thereby separating the ligneous materials from the insoluble cation salt, and other insoluble materials. In this instance, either the lignosulfonic acids or the salts may be recovered from the solution, depending upon whether the solution is neutralized before the solvent-water mixture or water is removed.

Now considering the supernatant liquid from the initial treatment of spent liquor solids, this liquid contains most of the carbohydrates in the form of glycosides or di-ylidenes, depending upon the type of solvent used. As used herein, di-ylidene compounds are those compounds resulting from the reaction of two moles of a carbonyl compound with one mol of a sugar with the formation of two moles of water. There are alternative methods by which these glycosides and di-ylidenes may be treated so as to recover either carbohydrate derivatives or individual carbohydrates.

It will be understood that if an alcohol is used in the initial treatment of the spent liquor solids, the carbohydrates will be in the form of glycosides but if a carbonyl compound is employed in the initial treatment, the carbohydrates will be in the form of di-ylidenes.

One method for treating a supernatant liquid containing glycosides results in the conversion of the glycosides to furfural, and levulinic and formic acids. In accordance with this method, the acidified alcohol solution is diluted with water and heated for a period of time sufficient to cause the glycosides to be hydrolyzed. The alcohol is then partially removed, thereby leaving a paste, removal being effected by any one of the conventional methods, such as distillation, and sufficient water is added to resolubilize the resulting paste. The mixture is then heated until the remaining alcohol is removed.

The water solution is subjected to a constant volume distillation, which results in a distillate comprising furfural that has formed by dehydration of pentoses. Since the furfural is heavier than water, a lower phase is formed in the distillate comprising furfural saturated with water, the upper phase of the distillate comprising water saturated with furfural. These phases may be separated in a separatory unit, and the furfural recovered from the lower phase by distillation under low vacuum conditions. The water fraction may be recycled through the process to recover the furfural contained therein.

Levulinic acid, which is formed from the hexose sugars and which is contained in the residue from the constant volume distillation, can be recovered, after removal of water, by high vacuum distillation.

Formation and recovery of furfural and levulinic acid can also be carried out by other methods known to the art.

As an alternative method, the spent liquor solids are mixed with an acidified ketone, such as acetone, to convert the carbohydrates to di-ylidene sugars, as above pointed out. The supernatant liquid containing such sugars is neutralized with a base, such as ammonium hydroxide, and the resulting precipitate is removed by filtration. The ketone is removed from the di-ylidene sugars by evaporation and, in order to prevent degradation of these sugars, it is has been found necessary to add a buffering agent, such as calcium carbonate, during evaporation.

As an alternate method of removing acid from the acid acetone extract, we have found that it may be desirable to use a suitable acid absorbing resin, such as Duolite A-7, instead of neutralizing with ammonium hydroxide.

A paste of di-ylidene sugars and low molecular weight lignins remains after the removal of the ketone and the paste is mixed with a water-water immiscible solvent mixture, such as a water-chloroform mixture. A two-phase system results and the phases may be separated in a separatory unit. The water phase contains solubilized low molecular weight lignins and the water immiscible solvent phase includes the di-ylidene sugars. The solvent may be evaporated and recovered leaving behind a syrup containing a mixture of crude di-ylidene sugars. These di-ylidene sugars may be recovered separately or may be hydrolyzed with an aqueous acid solution to furfural and levulinic acid in the manner previously described.

If the individual sugars are to be recovered, the syrup of the di-ylidene sugars may be subjected to steam distillation or to high vacuum distillation to separate the di-ylidene pentoses from the di-ylidene hexoses. In the case of steam distillation, the two di-ylidene pentoses are in the distillate, leaving the di-ylidene hexoses in the residue.

When high vacuum distillation is used, the di-ylidene pentoses distill off at a higher absolute pressure than the di-ylidene hexoses so that separation may be effected.

The pentose sugar compounds may be separated into the component xylose compound and arabinose compound because of the fact that the xylose compound is more sensitive to acid hydrolysis. Accordingly, the xylose compound may be partially hydrolyzed in an aqueuos acid medium, and the arabinose compound removed from the hydrolyzed xylose compound by high vacuum distillation, or by liquid-liquid extraction. The xylose compound may then be crystallized from its solution. However, before such crystallization, additional hydrolysis of the xylose compound may be desirable.

The xylose and arabinose compounds, which may be acetone compounds, are hydrolyzed to provide the pure sugars.

The hexose sugar compounds may be separated into the sugars, galactose, mannose and glucose. This may be done by utilizing the lesser solubility of diacetone mannose, also known as di-o-isopropylidene mannose. Accordingly, the diacetone mannose is separated from diacetone glucose and diacetone galactose by dissolving di-acetone derivatives of glucose and galactose in water or by concentrating an aqueous solution to cause crystallization of diacetone mannose. This removes the larger portion of the diacetone mannose. Advantage is also taken of the greater sensitivity of the remaining small portion of diacetone mannose and diacetone glucose to acid hydrolysis to separate these sugars from galactose. In this connection, the remaining aqueous solution of glucose and galactose compounds, i.e., after crystallization of diacetone mannose, may be acidified to cause partial hydrolysis of diacetone glucose, and any remaining portion of diacetone mannose, and the unhydrolyzed galactose compound is removed by liquid-liquid extraction, as by using chloroform and water. The galactose compound in the extract is subjected to complete hydrolysis causing galactose to crystallize out. The diactone glucose and remaining diacetone mannose are hydrolyzed further to provide the pure sugars.

Alternatively, the pentose sugar compounds, i.e., xylose and arabinose compounds, may be separated, and the hexose sugar compounds, glucose and galactose compounds, can be separated by passing aqueous solutions of these mixtures through a column containing an ion exchange material of the nuclear sulfonic type, such as those sold under the trade names IR-120 or Dowex 50. Cation exchange resins in the acid form catalyze the hydrolysis of diacetone sugars in essentially the same manner as does aqueous acid. The neutral, aqueous effluent of partially hydrolyzed diacetone sugars can be separated, as described above, into the "acid-sensitive" fraction and the "acid-resistant" fraction. These fractions can then be separately hydrolyzed to the free sugars, either by dilute aqueous acid or by the acid form of a cation exchange resin.

Specific examples illustrating the method of treating spent sulphite liquor solids are as follows:

Example I

A five-pound sample of calcium base spent sulphite liquor solids (95 percent solids) from the treatment of soft wood was mixed with sufficient acetone, about 15 liters, to give the mixture a fluid consistency. About 115 cc. of 95 percent sulfuric acid was added to a portion of the acetone before mixing with the solids and the mixture was refluxed with stirring at about 55° C. for four hours. The mixture was cooled and passed through a filter, and acetone was then passed through the filter until about forty liters of extract was collected. The filtrate was neutralized with ammonium hydroxide which caused precipitation and, after separation of the precipitate comprising lignosulfonates, the acetone was evaporated off the supernatant portion in the presence of excess calcium carbonate. The excess calcium carbonate prevented an acid condition from occurring during evaporation by formation of calcium salt. After acetone removal, the residue was mixed with a chloroform-water mixture and the insoluble salts removed. In the water phase, there are low molecular weight lignin materials which, of course, are soluble in acetone. These lignin materials are recovered by removal of the water. The clhoroform phase is treated by removing the chloroform and the residue is steam distilled at atmospheric pressure or distilled at high vacum and low temperatures, for example, 50° C. and about 500 microns absolute pressure, until no more pentoses are distilled off, as indicated by the conventional Molisch test. The distillate was partially hydrolyzed and extracted by adding chloroform in an amount equal to about 1/10 the volume of the distillate. The chloroform was separated from the aqueous solution and this procedure was repeated with a similar addition of chloroform. The choloroform portions were mixed and the chloroform was evaporated off to give the diacetone arabinose. The arabinose was recovered by subjecting the diacetone arabinose to hydrolysis. The water phase containing mono acetone xylose was also hydrolyzed to give xylose.

The still residue containing di-acetone hexoses was extracted with chloroform three times and the chloroform fractions were combined. The chloroform was evaporated off to give a mixture of di-acetone hexoses, including di-acetone mannose, diacetone galactose, and diactone glucose.

The di-acetone pentoses resulting from the above treatment weighed 69.9 grams, or 45.4 grams as pentoses; and the di-acetone hexoses weighed 103.7 grams, or 71.6 grams as hexoses.

Example II

A five-pound sample of dried spent calcium base sulphite liquor from hard wood was mixed with about 15 liters of acidified methyl alcohol, 115 cc. of sulfuric acid (95 percent concentration) being used to acidify the alcohol. The mixture was stirred for about two hours at 45° F. The residue containing lignous materials was separated from the methyl alcohol which contained the carbohydrate materials. The alcohol was partially evaporated from the carbohydrate material and water was added to the resulting paste. The mixture was then heated to distill off the remaining amount of alcohol, and the carbohydrate materials present were dehydrated by subjecting the mixture to a constant volume distillation to produce furfural, and levulinic and formic acids.

*Example III*

In the treatment of three pounds of dried spent sulphite liquor solids from hard wood, the solids were extracted with acetone solvent under acidic conditions, as described in Example I. The solvent was separated from the insoluble spent sulphite liquor residue. The insoluble residue, which weighed about 2¼ pounds, was mixed with an aqueous acetone solution containing about 80 percent acetone, by volume, and the solution was stirred. The residue was separated by filtration, and ammonium hydroxide was added to the filtrate to pH 7, resulting in a precipitate comprising about 5 percent of the initial solids. The supernatant liquid was removed and evaporated at low temperature under high vacuum to minimize polymerization.

The residue remaining after the aqueous acetone extraction was mixed with water and stirred. The mixture was filtered and the filtrate neutralized with ammonium hydroxide. The neutralized filtrate was subjected to evaporation and drying on a drum drier, the dried material comprising about 28 percent of the initial solids and including high molecular weight lignosulfonates. The solids in the filter substantially comprised calcium sulfate and comprised about 8 percent of initial solids.

In the foregoing, various ways have been specified for accomplishing certain separations. It will be understood by those skilled in the art that alternative procedures are in many instances available. By way of example, fractional distillation techniques can, in most instances, be substituted for the chloroform-water separations; and removal of solutes from solutions can be effected by the use of various ion exchange type resins.

In summary, it will be seen that in accordance with the present invention, many valuable products can be recovered from wood hydrolysates and spent sulphite liquor solids. In this connection, the process of the present invention has particular advantage in that the lignins and lignin materials can be separated from the carbohydrate material without damage to the lignin materials. It will be further seen that the lignin materials can be separated into fractions of various molecular weights and that the carbohydrates may be separated into individual sugars, or in the alternative, may be converted to furfural and levulinic acid. Thus, as a result of this invention, many new uses of spent sulphite liquor are made possible and a new source of many materials is provided.

The various fractions recovered in accordance with this invention can be used as medicine, adhesive, extender for adhesives, thermoplastic agent, intermediate material for a chelating agent, hygroscopic agent, foaming agent, and a source of many compounds, such as furfural levulinic acid, metasaccharinic acid, etc.

While this invention is particularly directed to the treatment of spent sulphite liquir direct from the digester, it may also be employed in connection with spent sulphite liquor which has been subjected to various treatments, such as fermentation treatments.

The various features of the invention which are believed to be new are set forth in the following claims.

We claim:
1. In a process for treating materials selected from the group consisting of spent sulphite liquor solids and wood hydrolysate solids containing carbohydrate materials and wood extractives, the steps of mixing and reacting substantially dry solids selected from said group with a material selected from the group consisting of lower alkyl alcohols and carbonyl compounds having less than eight carbon atoms to form a soluble carbohydrate compound, in the presence of free hydrogen ion, said solvent treatment being carried out at a temperature below about 55° C. and removing ligneous materials from the carbohydrate solution.

2. In the process for treating materials selected from the group consisting of spent sulphite liquor solids and wood hydrolysate solids containing ligneous materials, carbohydrate materials and base combined with lignosulfonic acid, the steps of mixing and reacting substantially dry solids with acidified acetone, the amount of acid in the solvent being equivalent to about the amount of base combined with lignosulfonic acid, at a temperature below about 55° C., separating the acidified acetone solution from the residue of insoluble ligneous materials, removing the acetone to concentrate the solids, solubilizing the concentrated solids in water and chloroform, separating the chloroform phase from the water phase, evaporating the chloroform from the chloroform phase to obtain a concentrated carbohydrate paste, and solubilizing the concentrated carbohydrate paste with water.

3. In the process for treating materials selected from the group consisting of spent sulphite liquor solids and wood hydrolysate solids containing ligneous materials, carbohydrate materials and base combined with lignosulfonic acid, the steps of mixing and reacting substantially dry solids with an acidified ketone having less than five carbon atoms, the amount of acid in said solvent being equivalent to about the amount of base combined with lignosulfonic acid, at a temperature below about 55° C., separating the acidified ketone solution from the residue of insoluble ligneous materials, removing the ketone to concentrate the solids, and solubilizing the concentrated solids in water.

4. In the process for treating materials selected from the group consisting of spent sulphite liquor solids and wood hydrolysate solids containing ligneous materials, carbohydrate materials including hexose and pentose sugars, and base combined with lignosulfonic acid, the steps of mixing and reacting substantially dry solids with an acidified ketone having less than five carbon atoms, the amount of acid with the ketone being equivalent to about the amount of base combined with lignosulfonic acid, at a temperature below about 55° C., separating the acidified ketone solution from the residue of insoluble ligneous materials, removing the ketone to obtain a solids concentrate, solubilizing the concentrated solids in water and chloroform, separating the chloroform phase from the water phase, evaporating the chloroform from the chloroform phase to obtain a concentrated carbohydrate paste, solubilizing the concentrated carbohydrate paste with water, and subjecting the mixture to a steam distillation to separate diacetone pentoses from the diacetone hexoses.

5. In the process for treating materials selected from the group consisting of spent sulphite liquor solids and wood hydrolysate solids containing ligneous materials, carbohydrate materials, including hexose sugars and the pentose sugars, xylose and arabinose, and base combined with lignosulfonic acid, the steps of mixing and reacting substantially dry solids with an acidified ketone having less than five carbon atoms, the amount of acid being equivalent to about the amount of base combined with lignosulfonic acid, at a temperature below about 55° C., separating the acidified ketone solution from the residue of insoluble ligneous materials, removing the ketone to concentrate the solids, solubilizing the concentrated solids in water and chloroform, separating the chloroform phase from the water phase, evaporating the chloroform from the chloroform phase to obtain a concentrated carbohydrate paste, solubilizing the concentrated carbohydrate paste with water, subjecting the mixture to a steam distillation to separate the di-carbonyl pentoses from the di-carbonyl hexoses, partially hydrolyzing the di-carbonyl pentoses, separating xylose from the dicarbonyl arabinose and recovering said xylose, and recovering arabinose by complete hydrolysis of the di-carbonyl arabinose.

6. In the process for treating materials selected from the group consisting of spent sulphite liquor solids and wood hydrolysate solids containing ligneous materials, carbohydrate materials including the hexose sugars, mannose, glucose, galactose, and the pentose sugars xylose and arabinose and base combined with lignosulfonic acid, the steps of mixing and reacting substantially dry solids with an acidified ketone having less than five carbon atoms, the amount of acid being equivalent to about the amount of base combined with lignosulfonic acid, at a temperature below about 55° C., separating the acidified ketone solution from the residue of insoluble ligneous materials, removing the ketone to concentrate the solids, solubilizing the concentrated solids in water and chloroform, separating the chloroform phase from the water phase to obtain a concentrated carbohydrate paste, solubilizing the concentrated carbohydrate paste with water, subjecting the mixture to a steam distillation to separate the di-carbonyl pentoses from the di-carbonyl hexoses, concentrating the di-carbonyl hexoses to crystallize di-carbonyl mannose, subjecting the solution to a partial hydrolysis, extracting dicarbonyl galactose from said solution with a suitable solvent and recovering crystallized galactose therefrom.

7. In the process for treating materials selected from the group consisting of spent sulphite liquor solids and wood hydrolysate solids containing ligneous materials, carbohydrate materials including hexose and pentose sugars, and base combined with lignosulfonic acid, the steps of mixing and reacting substantially dry solids with acidified acetone, the amount of acid with the acetone being equivalent to about the amount of base combined with lignosulfonic acid, at a temperature below about 55° C., separating the acidified acetone solution from the residue of insoluble ligneous materials, neutralizing the acid, removing the acetone to obtain a solids concentrate, solubilizing the concentrated solids in water and chloroform, separating the chloroform phase from the water phase, evaporating the chloroform from the chloroform phase to obtain a concentrated carbohydrate paste with water, and subjecting the mixture to a steam distillation to separate di-acetone pentoses from the di-acetone hexoses.

8. In the process for treating materials selected from the group consisting of spent sulphite liquor solids and wood hydrolysate solids containing ligneous materials, carbohydrate materials, including hexose sugars and the pentose sugars, xylose and arabinose, and base combined with lignosulfonic acid, the steps of mixing and reacting substantially dry solids with acidified acetone, the amount of acid with the acetone being equivalent to about the amount of base combined with lignosulfonic acid, at a temperature below about 55° C., separating the acidified acetone solution from the residue of insoluble ligneous materials, neutralizing the acid, removing the acetone to concentrate the solids, solubilizing the concentrated solids in water and chloroform, separating the chloroform phase from the water phase, evaporating the chloroform from the chloroform phase to obtain a concentrated carbohydrate paste, solubilizing the concentrated carbohydrate paste with water, subjecting the mixture to a distillation to separate the di-acetone pentoses from the di-acetone hexoses, partially hydrolyzing the di-acetone pentoses to separate the xylose from di-acetone arabinose and recovering arabinose by complete hydrolysis.

9. In the process for treating materials selected from the group consisting of spent sulphite liquor solids and wood hydrolysate solids containing ligneous materials, carbohydrate materials including the hexose sugars, mannose, glucose, galatose, and the pentose sugars, xylose and arabinose and base combined with lignosulfonic acid, the steps of mixing and reacting substantially dry solids with acidified acetone, the amount of acid with the acetone being equivalent to about the amount of base combined with lignosulfonic acid, at a temperature below about 55° C., separating the acidified acetone solution from the residue of insoluble ligneous materials, neutralizing the acid, removing the acetone to concentrate the solids, solubilizing the concentrated solids in water and chloroform, separating the chloroform phase from the water phase, evaporating the chloroform from the chloroform phase to obtain a concentrated carbohydrate paste, solubilizing the concentrated carbohydrate paste with water, subjecting the mixture to a steam distillation to separate the di-acetone pentoses from the di-acetone hexoses, concentrating the di-acetone hexoses to crystallize di-acetone mannose, separating the crystallized di-acetone mannose from the solution, subjecting the solution to a partial hydrolysis and a vacuum distillation to separate mannose and glucose as a residue, and subjecting the distillate to complete hydrolysis to crystallize the galactose.

References Cited in the file of this patent

UNITED STATES PATENTS

| | | |
|---|---|---|
| 2,526,607 | Kurth | Oct. 17, 1950 |
| 2,662,893 | Kurth | Dec. 15, 1953 |
| 2,699,998 | Morton | Jan. 18, 1955 |

OTHER REFERENCES

Mulvaney et al.: J. Am. Chem. Soc. 73, pp. 1255–1257 (1951).